Sept. 4, 1956    F. C. DRAEMEL ET AL    2,761,818
RECOVERY OF ETHANOLAMINES
Filed Sept. 24, 1952
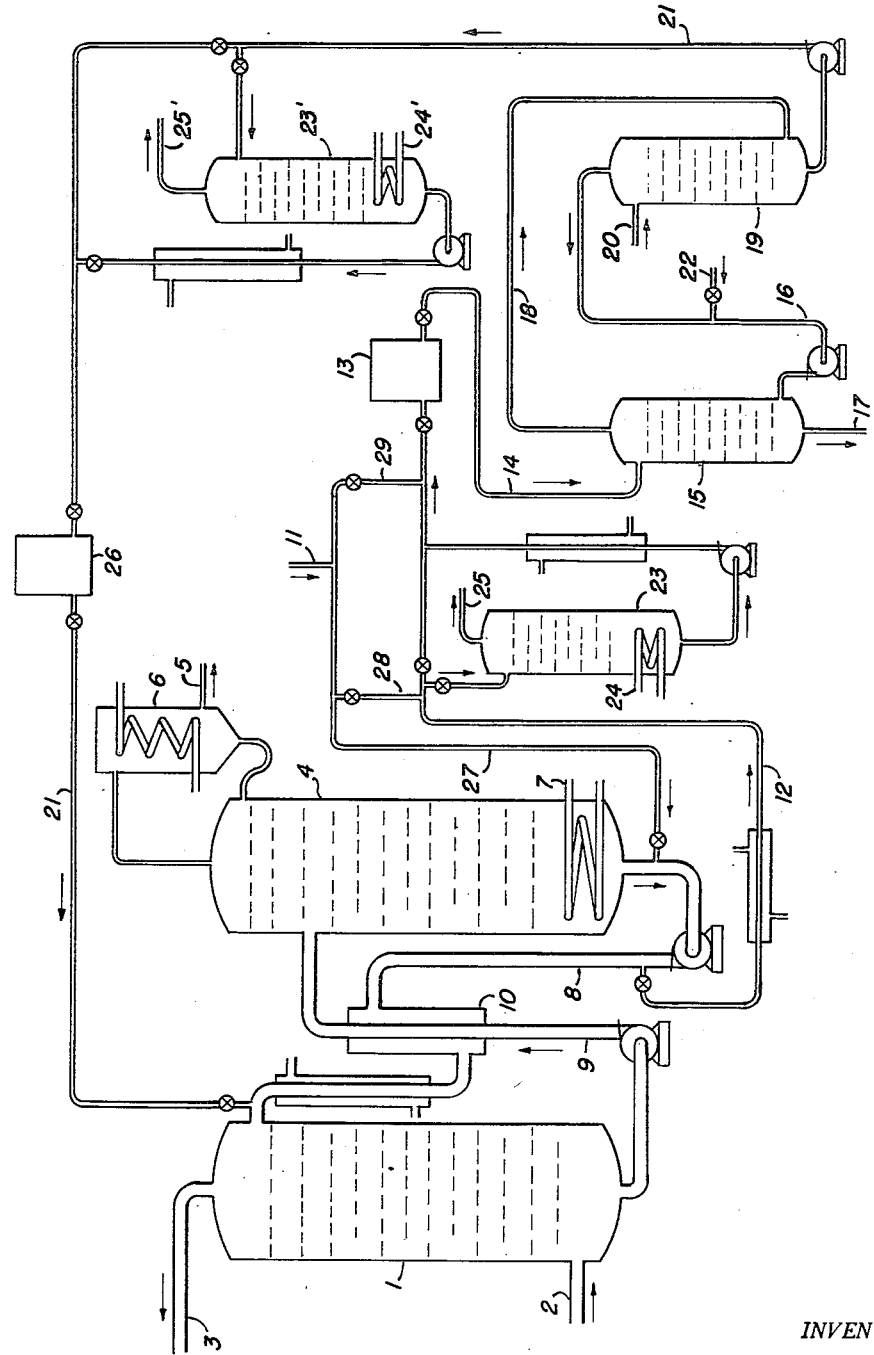
INVENTORS
FREDERICK C. DRAEMEL
LIONEL S. GALSTAUN
HARRY G. HALL
BY Thomas G. Bell
AGENT

United States Patent Office 2,761,818
Patented Sept. 4, 1956

2,761,818

RECOVERY OF ETHANOLAMINES

Frederick C. Draemel, Concord, Lionel S. Galstaun, Oakland, and Harry G. Hall, Martinez, Calif., assignors to Tidewater Oil Company, a corporation of Delaware Application September 24, 1952, Serial No. 311,252

16 Claims. (Cl. 196—32)

This invention relates to the purification of ethanolamine solutions and, in particular, to the removal of organic acids and salts from such solutions by means of extraction with alcohols. It is especially adapted to the removal of organic acids and salts thereof from ethanolamine solutions which have been used in the regenerative removal of hydrogen sulfide from certain petroleum refinery operations.

In order to remove hydrogen sulfide from petroleum refinery gases and, also, from certain liquified petroleum products, it is common practice to contact streams containing hydrogen sulfide with an aqueous solution of an ethanolamine, whereby the hydrogen sulfide is absorbed, and then to regenerate the ethanolamine solution for repeated further use. This regeneration is accomplished by steam (or heat) stripping the hydrogen sulfide from the ethanolamine solution. Such a procedure is described in U. S. Reissue Patent 18,958. In cases where the hydrogen sulfide content of the gas, or liquid, stream is appreciable, such procedure has almost completely replaced the use of strong alkalis such as aqueous sodium hydroxide solution for removing the hydrogen sulfide, since such strong hydroxide can not readily be regenerated and its use would entail a prohibitive reagent cost. However, some refinery streams containing large quantities of hydrogen sulfide also include small amounts of stronger acidic materials, such as acetic acid, formic acid and the like. When these streams are treated to remove hydrogen sulfide by the regenerative ethanolamine procedure, due to their higher acidity these stronger acids are not removed in the steam regeneration step but form more or less permanent ethanolamine salts which, in time, consume the ethanolamine and render it unsuited for further use. An expedient commonly used to extend the life of such contaminated ethanolamine solutions is the addition thereto of sufficient strong alkali, such as sodium hydroxide, to decompose the ethanolamine salts thereby forming sodium salts and liberating the ethanolamine. Such expedient, however, is only of a temporary nature for, in time, the resulting sodium salts accumulate in the ethanolamine solution until it becomes ineffective and must be replaced, thereby resulting in a substantial loss of a relatively expensive reagent.

The present invention is directed to a process for recovering ethanolamine from such contaminated solutions. In accordance therewith, an ethanolamine in a solution containing strong organic acids, but from which weak acids such as hydrogen sulfide have been removed, is extracted in several stages, preferably countercurrently, with certain alcohols which are relatively insoluble in water yet are satisfactory solvents for ethanolamine. The ethanolamine is thereby extracted from the salt contaminated water solution and enters the alcohol phase. The resulting alcohol-ethanolamine solution is then extracted with water in several stages, also preferably in a counter-current manner, whereby a water solution of ethanolamine is produced. The aqueous ethanolamine solution may then be returned to the refinery for reuse in hydrogen sulfide removal, and the water-washed alcohol reused for further extraction of salt contaminated ethanolamine solution.

The alcohols suited for the process are aliphatic alcohols having from 5 to 8 carbon atoms, the preferred being n-hexanol. Mixtures of such alcohols may be advantageously used, especially when they can be obtained more economically than relatively pure materials. While the 5 carbon atom alcohols are useful, their greater solubility in water than the higher molecular weight alcohols results in higher material losses occasioned by their dissolving in the aqueous salt contaminated solutions during the extraction of the ethanolamine. Alcohols of 7 and 8 carbon atoms are less effective extractants than 6 carbon atom alcohols because of their lower solubility for ethanolamine, but have the advantage of lower water-solubility losses.

The invention may be more readily understood by reference to the accompanying drawing which illustrates in diagrammatic form the present invention as used in conjunction with a hydrogen sulfide-ethanolamine treating process.

In the drawing, the hydrogen sulfide regenerative removal process is represented by absorber 1, having inlet line 2 for a gaseous stream of hydrocarbons containing hydrogen sulfide along with other acid gases, outlet line 3 for return of stripped hydrocarbons, regenerator 4 with hydrogen sulfide gas outlet 5 attached to the regenerator by means of "knockback" condenser 6, heater 7 for supplying stripping action to the regenerator, line 8 for transferring H₂S lean ethanolamine solution from regenerator 4 to absorber 1, and transfer line 9 for transferring H₂S fat ethanolamine solution from absorber 1 to regenerator 4 through heat exchanger 10. Lines 11 and 27 may be provided for caustic alkali additions needed to neutralize organic acids.

In accordance with the present invention there is provided line 12 for removing contaminated ethanolamine solution from the system. In line 12 there may be provided storage or surge tank 13 connected by line 14 to the alcohol extraction apparatus represented by counter-current contacting tower 15. In tower 15, line 16 is provided for the introduction of alcohol and lines 17 and 18 for, respectively, the outflow of waste salt solution and alcohol-amine solution. Line 18 enters water contacting apparatus represented by contacting tower 19 which is provided with water inlet line 20 and aqueous amine outlet line 21. Make up alcohol may be fed into the system through line 22 as required. Stripping towers 23 and 23' may be advantageously provided for concentration of the amine solution as will be more fully described later. Steam coils 24 and 24' are provided to supply heat for eliminating excess water which leaves the system through exit lines 25 and 25'. A surge or storage tank 26 may be provided in line 21 which provides for returning the recovered amine solution to absorber 1. Lines 27, 28, and 29 may be provided for supplying caustic solution from line 11, as desired, to neutralize any acids present.

As is now well known in the art, hydrocarbon gases containing hydrogen sulfide are fed into absorber 1 wherein they pass upwardly and countercurrently to a downward stream of ethanolamine solution. Usually such amine solution is an aqueous solution containing 10% to 20% of monoethanolamine, diethanolamine, or triethanolamine. The amine solution, due to its alkalinity, extract the H₂S from the gases which leave through line 3. The foul amine solution passes through line 9 to regenerator 4 wherein due to heat supplied by coil 7 it is stripped of its H₂S which leaves through line 5 for disposal. The amine solution, stripped of its H₂S, is returned to absorber 1 through line 8. As stated above, in frequent cases the hydrocarbon gases contain small quantities of stronger acids or acid forming materials which are not stripped from the amine solution in stripper 4. In such cases the life of the amine solution may be extended somewhat by the addition of caustic solution from line 11, as through line 27. As the resulting alkali salts accumulates in the solution it would normally be necessary ultimately to discard at least a part of the amine solution, as through line 12, and supply fresh make up amine from tank 26 through line 21. In this connection, the processing heretofore described is consonant with conventional practice.

In accordance with the invention, amine solution which has been contaminated by accumulation of strong organic acids or by alkali salts thereof is withdrawn through line 12. If batch recovery of the amine is desired, the withdrawn stream may be passed to storage tank 13 to await processing. However, the invention may also be applied by withdrawing a small continuous stream of contaminated amine solution through line 12 and passing it directly to contactor 15. In either case amine solution, obtained either from tank 13 or directly through line 12, is passed through line 14 to contactor 15 wherein it is passed countercurrently to a water immiscible alcohol entering contactor 15 through line 16. As the amine solution passes downwardly through contactor 15 at least the major portion of the amine in the aqueous solution is extracted by the alcohol, and the remaining solution containing substantially all of the salts and, possibly, some unextracted amine passes out through line 17 to discard.

The amine-enriched alcohol leaves tower 15 through line 18 and is fed into the bottom of tower 19 wherein it passes upwardly countercurrent to a stream of water introduced through line 20. The water extracts from the alcohol the amine dissolved therein and leaves tower 19 through line 21. The alcohol, now freed of most of its amine, is returned to tower 15 through line 16 for further use therein. Depending upon the ratio of water to alcohol-amine solution introduced into tower 19, the aqueous solution of amine may be either more concentrated or more dilute than is desired in the hydrogen sulfide extraction. In either case proper adjustment of amine content may be made by addition of water in tank 26 or, usually, by stripping out water by stripper 23' which may conveniently be interposed in line 21.

In the event that it is desired to concentrate the amine solution fed to extractor 15 this may be accomplished by passing the solution through stripper 23 by operating valves supplied for this purpose. In the operation of strippers 23 and 23' the descending amine solution passes in contact with upwardly rising vapors produced by heating coils 24 and 24'. Excess water is driven off through lines 25 and 25' and the concentrated amine solution after cooling is returned to lines 12 and 21 respectively.

Depending upon the concentration of amine in the contaminated solution, the particular alcohol used, and somewhat on the temperature, the ratio of alcohol to amine solution may vary over fairly wide limits. If too little alcohol is used insufficient extraction of amine will result and, if too much, there may be difficulty in the subsequent water extraction step in tower 19, i. e., much water will be needed for efficient extraction of the amine from the alcohol, resulting in a more dilute recovered amine solution. In view of the fact that the ethanolamine is considerably more soluble in the water than in the alcohol, for efficient countercurrent extraction the stream of alcohol circulated between towers 15 and 19 should be several times greater than the stream of contaminated amine solution fed to tower 15 through line 14. Good extraction may be obtained with an efficient tower when circulating 8 to 12 volumes of alcohol, for example n-hexanol, per volume of amine feed solution; though a lower ratio may be used if lower recovery of amine is acceptable. Likewise, the ratio of water to alcohol-amine solution introduced into tower 19 may be varied, large amounts of water resulting in weaker amine solutions returned to the $H_2S$ absorption process through line 21, while too little water results in power extraction of amine from the alcohol returned to tower 15 which in turn will increase losses of amine in the rejected salt solution in line 17. Too much water may also result in the loss of excessive amounts of alcohol, depending upon the water solubility of the particular alcohol used. Ordinarily, the ratio of the water to the amine in the alcohol-amine solution may advantageously be such as to give approximately the required concentration of amine in the solution leaving tower 19 through line 21. The stream of fresh water fed to tower 19 may be only a fraction of the volume of alcohol circulated. Thus, a ratio of water to alcohol between 1:4 and 1:6 may be used.

As will be readily apparent to the skilled engineer, the extractions in towers 15 and 19 will not normally be complete depending upon many factors, such as temperature, alcohol used, proportions, efficiency, number of stages of contact, and the like. Thus, the waste salt solution leaving tower 15 through line 17 may contain some unextracted amine. This may vary, depending on conditions, from a negligible amount up to even 25% or more. Though this represents a loss of amine, such loss may be reconciled by the recovery of the remainder of amine, which is totally lost in conventional practice. Likewise, the alcohol solution leaving tower 19 may contain some unextracted amine, which for best operations should be maintained at a low value. Likewise, the water-amine solution leaving tower 19 may contain traces of alcohol which will not interfere in the hydrogen sulfide absorption process and will eventually return at least in part to the amine recovery system through line 12. The waste salt solution leaving tower 15 will contain small amounts of alcohol, depending on the solubility of the particular alcohol in such solution. As this represents a loss of treating agent, conditions should be so chosen to minimize this loss. This may be accomplished by proper selection of alcohol, and ratio of alcohol to contaminated amine solution.

In order to neutralize any free acid in the contaminated solution fed to tower 15 through line 14, caustic is added from line 11 through lines 28 or 29 as desired.

To illustrate the effectiveness of the various $C_5$ to $C_8$ alcohols for use in the process, the following table is presented showing the solubility of several $C_5$ to $C_8$ alcohols in water and the amount of amine which may be extracted from aqueous solution by such alcohols when an aqueous amine solution is agitated with an equal volume of alcohol.

| Alcohol | Solubility in $H_2O$*, Weight, Percent | Percent Amine Extracted from Aqueous Solution* |
| --- | --- | --- |
| n-amyl alcohol | 2.7 | 15.2 (diethanolamine) |
| methyl amyl alcohol | 1.7 | 7.3 (monoethanolamine) |
| Do | 1.7 | 7.9 (diethanolamine) |
| Do | 1.7 | 8.9 (triethanolamine) |
| 2-ethyl butanol | 0.43 | 8.3 (diethanolamine) |
| n-hexanol | 0.58 | 11.9 (diethanolamine) |
| 2-ethyl hexanol | 0.10 | 5.8 (diethanolamine) |
| n-octanol | 0.12 | 6.1 (diethanolamine) |

*At 70° F.

It will be noted from the table that the n-hexanol offers the advantage of low water solubility combined with good solubility of amine, although the other alcohols may be suitable.

To further illustrate the invention the following example shows a particular application:

*Example.*—A stream of contaminated diethanolamine solution substantially free from hydrogen sulfide but containing about 15% diethanolamine and about 5% of sodium salts of the lower aliphatic acids, may be countercurrently extracted at a temperature of about 80° F. with eight times its volume of n-hexanol. The residual aqueous solution from the extraction will contain substantially all the salts and most of the water, together with a small amount of the amine and a trace of alcohol. The extracted amine-alcohol solution, containing about 98% alcohol and about 2% amine, is then countercurrently extracted with one-quarter its volume of water. The resulting water solution will contain approximately 7% amine which is suitable for reuse as an absorbent for $H_2S$ in the purification of hydrocarbon gases. The extracted alcohol, still containing minor amounts of amine, is returned for further extraction of additional contaminated amine solution. Depending on the efficiency of the extraction apparatus, the amine recovery in the foregoing procedure may vary from 85% to 95%.

It is to be understood that while the invention is described above in connection with the treatment of hydrocarbon gases to remove hydrogen sulfide, no claim is made to this step per se. Ethanolamines are used commercially in similar manner to treat liquified hydrocarbons for hydrogen sulfide removal and the invention is appropriately applicable thereto. The primary feature required for use of the invention is that the amine solution is contaminated with strong acids or salts thereof.

While in the foregoing there are described the preferred embodiments of the invention which have been found in practice to give satisfactory and reliable results, it is to be understood that the same is susceptible of modification in various particulars without departing from the spirit or scope of the invention or sacrificing any of its advantages. As an example, in a specific illustration of the invention as set forth in the foregoing the process was carried out at a temperature of 80° F., however, the temperature may vary between 40° F. and 120° F. or even higher or lower, the higher temperatures tending toward less selective extractions while the lower temperatures may not justify the cost of any refrigeration required. As another example, the extraction towers 15 and 19 are shown in the drawing as containing contact trays, whereas various forms of contact apparatus will be recognized as suitable for use, such as Raschig ring packed towers, and the like. Furthermore, the operations of the invention may be carried out in a plurality of settling vessels with mixing devices suitably disposed therebetween.

We claim:

1. A process of recovering substantially salt-free ethanolamine from an aqueous ethanolamine solution contaminated with dissolved salts which comprises: mixing such solution with a substantially water-immiscible aliphatic alcohol containing from 5 to 8 carbon atoms thereby forming an alcohol phase enriched in ethanolamine content and an aqueous phase containing said salts in solution, separating from the resulting mixture alcohol enriched in ethanolamine content, then recovering ethanolamine from said enriched alcohol.

2. A process of recovering substantially salt-free ethanolamine from an aqueous ethanolamine solution contaminated with dissolved salts which comprises: mixing such solution with a substantially water-immiscible aliphatic alcohol containing from 5 to 8 carbon atoms thereby forming an alcohol phase enriched in ethanolamine content and an aqueous phase containing said salts in solution, separating from the resulting mixture alcohol enriched in ethanolamine content, then mixing said enriched alcohol with substantially salt-free water and separating from the alcohol-water mixture water containing ethanolamine in solution.

3. A process of recovering substantially salt-free ethanolamine from an aqueous ethanolamine solution contaminated with dissolved salts which comprises: mixing such solution with a substantially water-immiscible aliphatic alcohol containing from 5 to 8 carbon atoms thereby forming an alcohol phase enriched in ethanolamine content and an aqueous phase containing said salts in solution, separating from the resulting mixture alcohol enriched in ethanolamine content, then mixing said enriched alcohol with substantially salt-free water and separating from the alcohol-water mixture water containing ethanolamine in solution, then treating additional contaminated aqueous ethanolamine solution with the alcohol from which said water has been separated.

4. A process of recovering substantially salt-free ethanolamine from aqueous ethanolamine solutions contaminated with dissolved salts which comprises: contacting such a solution with sufficient substantially water-immiscible aliphatic alcohol containing from 5 to 8 carbon atoms to extract into solution in said alcohol the major portion of said ethanolamine while leaving most of the water as a separate aqueous phase containing said salts in solution, separating the resulting alcohol-ethanolamine solution from said aqueous phase, contacting the separated alcohol solution with sufficient substantially salt-free water to extract into said water the major portion of the ethanolamine content of said alcohol solution while leaving most of the alcohol as a separate phase and separating the resulting water-ethanolamine solution from the alcohol phase and returning said alcohol phase to the process for contacting with additional contaminated aqueous ethanolamine solution.

5. A process of recovering substantially salt-free ethanolamine from contaminated aqueous ethanolamine solutions which comprises: countercurrently contacting a stream of aqueous ethanolamine solution containing dissolved salts of strong acid radicals with a stream of substantially water-immiscible aliphatic alcohol of from 5 to 8 carbon atoms obtained from a later stage of the process under conditions sufficient to extract into said alcohol stream the major portion of the ethanolamine content of said aqueous stream while leaving said salts dissolved in said aqueous stream, withdrawing the thus enriched alcohol stream from contact with said aqueous stream and passing the same in countercurrent contact with a stream of substantially salt-free water under conditions sufficient to extract into said water stream the major portion of the ethanolamine content of said enriched alcohol stream, withdrawing the resulting stream of water-ethanolamine solution and returning the resulting ethanolamine-lean alcohol stream to the process as the aforesaid stream of aliphatic alcohol.

6. A process according to claim 5 wherein the ethanolamine is monoethanolamine.

7. A process according to claim 5 wherein the ethanolamine is diethanolamine.

8. A process according to claim 5 wherein the ethanolamine is triethanolamine.

9. A process according to claim 5 wherein the aliphatic alcohol is a member of the group consisting of n-amyl alcohol, methylamyl alcohol, 2-ethyl butanol, n-hexanol, 2-ethyl hexanol and n-octanol.

10. A process according to claim 9 wherein the aliphatic alcohol is methylamyl alcohol.

11. A process according to claim 9 wherein the aliphatic alcohol is 2-ethyl butanol.

12. A process according to claim 9 wherein the aliphatic alcohol is n-hexanol.

13. A process according to claim 9 wherein the aliphatic alcohol is 2-ethyl hexanol.

14. A process according to claim 9 wherein the aliphatic alcohol is n-octanol.

15. In a process of treating petroleum fractions containing relatively large amounts of hydrogen sulfide and relatively minute amounts of stronger acids and wherein the petroleum fractions are treated with aqueous ethanolamine solution to remove said hydrogen sulfide and said ethanolamine solution is regenerated by stripping said hydrogen sulfide therefrom, the method of preventing the accumulation of ethanolamine salts of said stronger acids in said ethanolamine solution comprising: withdrawings regenerated ethanolamine solution, adding alkali hydroxide to decompose ethanolamine salts of said stronger acids and form alkali salts thereof, contacting the withdrawn ethanolamine solution with substantially water-immiscible aliphatic alcohol of from 5 to 8 carbon atoms under conditions sufficient to dissolve into said alcohol the major portion of the ethanolamine content of said withdrawn ethanolamine solution while leaving said alkali salts dissolved in the resulting ethanolamine-impoverished aqueous solution, separating the thus enriched alcohol from the thus impoverished aqueous solution, discarding said impoverished aqueous solution, then contacting said enriched alcohol with substantially salt-free water under conditions sufficient to dissolve into said water the major portion of the ethanolamine content of said enriched alcohol thereby forming a water-ethanolamine solution and an ethanolamine-impoverished alcohol solution, separating the resulting water-ethanolamine solution and returning the same to the process for treating further quantities of petroleum fractions, and returning the thus impoverished alcohol for contact with further quantities of withdrawn aqueous ethanolamine solution.

16. A process according to claim 15 in which the aqueous ethanolamine solution contains from about 10% to about 20% by weight of ethanolamine.

References Cited in the file of this patent

UNITED STATES PATENTS

| | | |
|---|---|---|
| 2,311,342 | Kerns | Feb. 16, 1943 |
| 2,497,954 | McCulley | Feb. 21, 1950 |
| 2,578,602 | Rosenstein | Dec. 11, 1951 |
| 2,634,231 | Johnstone | Apr. 7, 1953 |
| 2,701,750 | Paulson et al. | Feb. 8, 1953 |

OTHER REFERENCES

Cumming et al.: "Systematic Organic Chemistry," p. 35 (1932).